United States Patent Office 3,361,287
Patented Jan. 2, 1968

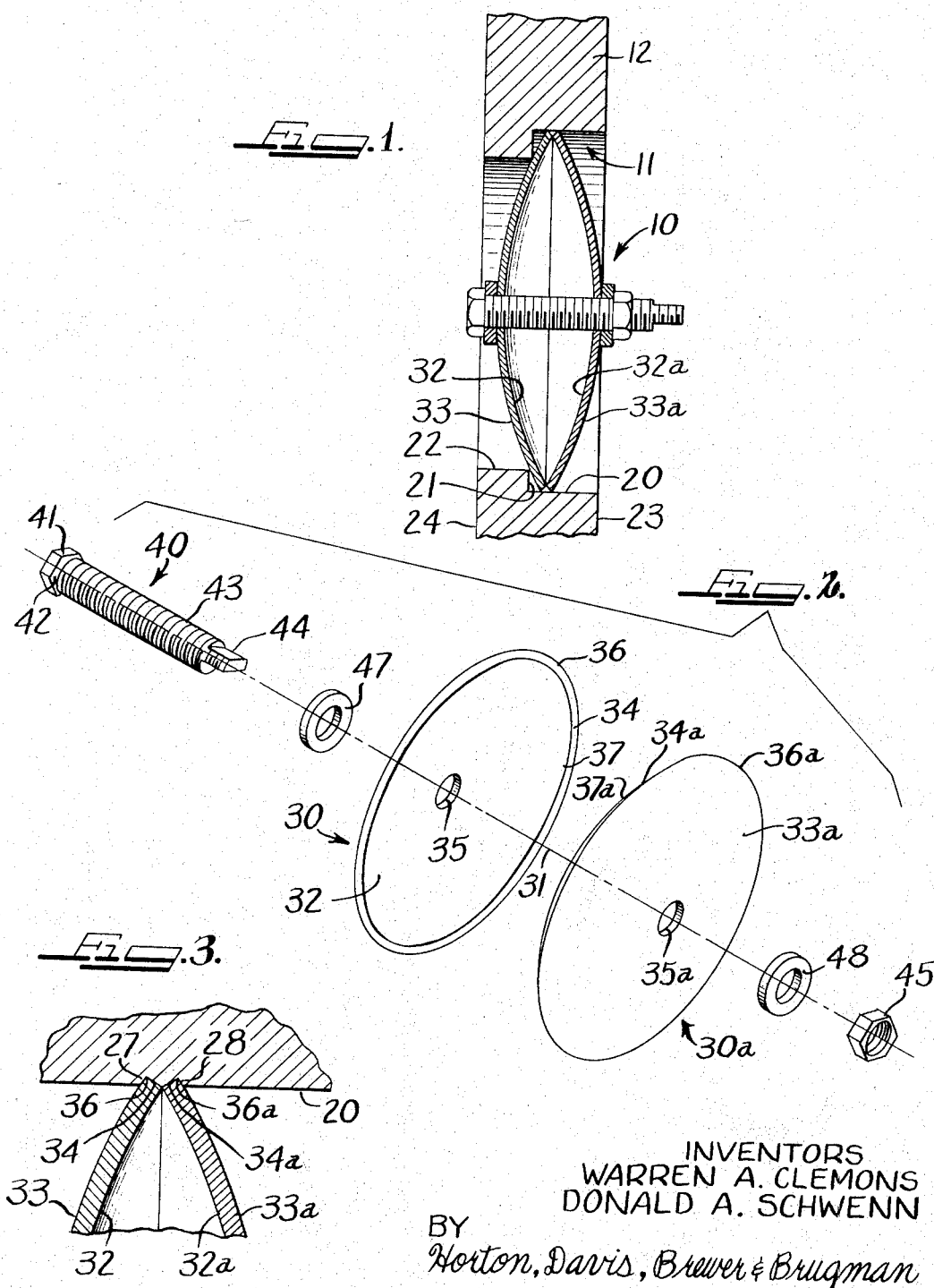

3,361,287
METHOD AND APPARATUS FOR SEALING AN OPENING IN A RIGID STRUCTURE
Warren A. Clemens and Donald A. Schwenn, Columbia City, Ind., assignors to C.S.C. Corporation, Fort Wayne, Ind., a corporation of Indiana
Filed July 9, 1965, Ser. No. 470,749
7 Claims. (Cl. 220—24.5)

ABSTRACT OF THE DISCLOSURE

The application relates to method and means for providing an expandable plug device for sealing an opening in a rigid supporting wall, which said plug means is adaptable to subsequent circumferential retraction to be readily removed from the opening.

---

This invention relates generally to a method and means for sealing openings in a walled structure and is particularly directed to an expandable plug for sealing an opening provided in a rigid supporting structure by a smooth wall, and a method of sealing such an opening.

Openings are provided in numerous structures for purposes such as inspection of the interior of the structure and elements contained therein; access for regulation and removal of contained elements; evacuation of the space enclosed by the structure, and to serve as communication passages between the structure and appurtenances associated therewith, either by direct means or by means of conductors. A plug used to seal an access opening is a necessary element of the structure itself, and hence, is subject to the conditions under which the structure is operated. However, a plug may be permanently installed or used temporarily to seal an otherwise open passage for purposes of testing the structure and as a protective barrier. Since the conditions under which such structures are operated and tested are of a diverse nature, it is desirable that a plug used therewith be capable of efficient sealing operation at elevated temperatures and pressures and resistant to the corrosive effects of adverse chemical environments. For all of the uses described above, it is also desirable that the plug be readily removable.

While certain openings in rigid supporting structures are adapted to receive conventional plug means such as tapered, threaded pipe plugs, blind flanges, hand hole covers, and the like, many openings are not adapted for use with such conventional plugs. Thus, walls defining an opening which are generally smooth, present a difficult sealing problem, for the smooth wall does not afford means to constrain a plug against axial displacing forces. It is thus desirable that such openings be sealed by plug means capable of retentive engagement with the smooth wall of an opening, and that the retentive capability of the plug means be regulatable to withstand different axial displacing forces. Additionally, since the size and configuration of openings in such structures are diverse, it is desirable that the method and means for sealing such an opening utilize readily available and inexpensive materials, to the end that it is economically feasible for a user to maintain a stock of material to satisfy particular needs as they arise.

It is therefore an object of this invention to provide an expandable plug for sealing an opening in a rigid supporting structure, wherein the opening is defined by a wall with a generally smooth surface.

Another object of this invention is to provide a method for sealing a smooth walled opening in a rigid supporting structure.

Another object of this invention is to provide a plug for sealing an opening in a rigid supporting structure, said plug having a body formed of a material adapted to withstand the pressure, temperature and composition of adverse environmental media in which the structure may be operated.

A further object of this invention is to provide an expandable plug for sealing a smooth walled opening in a rigid supporting structure, the periphery of said plug being adjustably expandable to engage and indent the wall of the opening and thereby positively constrain the plug in the opening.

It is another object of this invention to provide an expandable plug for sealing a smooth walled opening in a rigid supporting structure, the periphery of said plug being smaller than the wall of the opening to permit its ready insertion therein, and regulatably expandable to engage the wall of the opening in sealing contact, the degree of sealing contact being regulatable to restrain the plug axially in the opening against displacing forces.

It is also an object of this invention to provide an expandable plug for sealing a smooth walled opening in a rigid supporting structure, said plug being simply constructed of few components formed of readily available and inexpensive material.

Still another object of this invention is to provide an expandable plug for sealing a smooth walled opening in a rigid supporting structure and which is subsequently contracted and readily removed from the opening.

These and other objects, features and advantages of this invention will become apparent from the following description, as illustrated in the accompanying drawings, in which:

FIG. 1 is a sectional view of the plug engaged in an opening in a rigid supporting structure;

FIG. 2 is an exploded perspective view of the plug of FIG. 1, and

FIG. 3 is an enlarged fragmentary view of the plug of FIG. 1, illustrating the manner of contact between the periphery of the plug and the wall of the opening.

Although it will be understood that the present invention is not so limited, the presently selected embodiment will be described as a method and means for sealing an opening in a rigid supporting structure wherein the opening is defined by a cylindrical wall. The present invention is also adapted to the sealing of openings of diverse boundary configurations such as circular, eliptical and rectangular openings.

Referring now to the drawings, FIG. 1 illustrates an opening 11 formed through a rigid supporting structure 12 sealed by a plug 10. Structure 12 may be the external wall of an engine block or other metal housing, but this invention is not limited to this particular structure, nor is it limited to structures formed of metal. Opening 11 is defined by a generally cylindrical, smooth wall 20 which extends inwardly from the outer face 23 of structure 12 to an inwardly extending radial shoulder 21 and a smaller cylindrical wall 22 extending from shoulder 21 to the inner face 24 of structure 12. While, in FIG. 1, plug 10 is shown in contact with shoulder 21, it will be understood that shoulder 21 is not necessary to the application of this invention. The purpose of so illustrating plug 10 in this opening is twofold; first, openings of this general configuration are commonly employed in articles of manufacture, and second, the versatility of the method and means of the present invention to the sealing of openings of irregular axial configuration is illustrated thereby.

Elements used to practice the invention and their arrangement are shown in FIG. 2. In this embodiment, discs 30 and 30a of plugs 10 are identical members formed of a material such as mild steel. Since they are identical and perform essentially the same functions, for purposes of description disc 30 only will be described in detail. Disc 30 is a yieldable dished member having a concave face 32, a convex face 33, a generally circular peripheral portion 34, and an aperture 35 formed through its central portion. Deforming disc 30 to reduce its degree of concavity relatably enlarges the extent of its periphery.

Discs 30 and 30a are arranged along central axis 31 in opposing aligned positions with their concave faces 32 and 32a facing one another and are in bearing contact along respective bearing portions 37 and 37a. Bolt 40 is positioned in concentric apertures 35 and 35a with its head 42 in bearing contact with the portion of convex face 33 adjacent aperture 35 and its shank end 43 extending through aperature 35a of disc 30a. Nut 45 is threadedly engaged on shank end 43 of bolt 40 and brought into bearing contact with the portion of convex face 33a adjacent aperture 35a of disc 30a. Desirably, in this embodiment, gasket 47 is disposed between head 42 and convex face 33, and gasket 48 is disposed between nut 45 and convex face 33a to seal the junctions between bolt 40, nut 45, and respective apertures 35 and 35a in said discs. Peripheral portions 34 and 34a of discs 30 and 30a intersect the respective convex and concave faces thereof generally at right angles. Peripheral ridges 36 and 36a define the greatest diameter of discs 30 and 30a respectively, and are formed by the intersection of the respective peripheral portion and convex face of discs 30 and 30a.

Plug 10 is adapted to be positioned in opening 11 with its central axis 31 generally coincident with the axis of opening 11, and when plug 10 is positioned in opening 11, its greatest diameter is less than the inside diameter of opening 11, so that plug 10 is slightly spaced from wall 20. In practice, I have found that an outside diameter of plug 10 of from 0.005" to 0.0015" smaller than the diameter of opening 11 provides for ready insertion of the plug and subsequent effective sealing of the opening.

Shank 43 of bolt 40 is arranged to extend beyond nut 45, the extended portion 44 being flattened to accept a wrench or other torque tool. Thus, bolt 40 may be held non-rotatably at either or both sides of the plug, i.e., by extended portion 44 or by head 41. Thus, in an opening of a structure to which access may be had from only one side thereof, bolt 40 may be held non-rotatably by extended portion 44 while nut 45 adjacent thereto, is tightened. When nut 45 is tightened on bolt 40, yieldable discs 30 and 30a are urged toward one another, their concavity reduced, and their respective peripheral ridges 36 and 36a urged toward wall 20 of opening 11. However, it will be understood that this invention is not limited to use of nut and bolt means for urging the discs 30 and 30a toward one another. Rather, the method and means of this invention may be practiced by any suitable means of deforming discs 30 and 30a to reduce their concavity.

In this embodiment, peripheral ridges 36 and 36a are adapted to indent wall 20 generally uniformly as the peripheral portions 34 and 34a are enlarged by tightening nut 45 on bolt 40, to form generally parallel circular indentations 27 and 28 in wall 20.

Among other things, the degree to which disc 30 and 30a indent wall 20, upon a given reduction of their respective concavities, depends upon the relative physical character of structure 12 and discs 30 and 30a. However, within the range of indentation of a given structure by a pair of discs suitable for use therewith, plug 10 is positively constrained against axial displacement by the bearing engagement of the peripheral edges of convex faces 33 and 33a with circular indentations 27 and 28 respectively in wall 20. Additionally, plug 10 is regulatable by selectively deforming discs 30 and 30a to alter their degree of indentation in wall 20 and thereby provide a desired degree of resistance to axial displacement in opening 11. Thus, for example, in this embodiment where mild steel discs are used to seal an opening in an engine block, the degree of resistance offered by plug 10 in opening 11 is predictable by selective operation of nut 45 on bolt 40.

Plug 10 is readily removed from opening 11 by loosening nut 45 on bolt 40 and thereby relieving the deforming force on discs 30 and 30a, whereupon the yieldable discs assume a more concave configuration with a resultant decrease in their respective periphery, thus permitting plug 10 to be removed from opening 11.

It will be understood that the use of the term "deformation" in describing a change in the concavity of discs 30 and 30a and "indentation" used in describing the sealing engagement of the peripheral edges of discs 30 and 30a with wall 20 of the opening, include elastic and plastic deformation and indentation. Thus, it is within the contemplation of this invention to provide a method and means of sealing an opening in a rigid supporting structure with yieldable concave discs, where the wall of the opening and the discs are indented and deformed respectively only within their elastic range and therebeyond into their plastic range.

We claim:

1. In a rigid supporting structure having wall means defining an opening therein, an expandable plug comprising a first yieldable member, a second yieldable member, each yieldable member defining a concave body portion and a peripheral portion defining the extent of said body portion, said yieldable members being arranged in opposing positions with their respective concave body portions confronting each other, and being in direct bearing contact along respective bearing portions adjacent their respective peripheral portions, adjustable deforming means to reduce the concavity of said concave body portions of said yieldable members and thereby relatably enlarge said peripheral portion of each of said yieldable members into sealing engagement with the wall of an opening, said adjustable deforming means upon opposite movement thereof resulting in an increase in the concavity of said concave body portions of said yieldable members and thereby relatably reduce said peripheral portion of each of said yieldable members for removal from said opening.

2. In a rigid supporting structure having wall means defining an opening therein, an expandable plug comprising a first yieldable member, a second yieldable member, each yieldable member defining a concave body portion and a peripheral portion defining the extent of said body portion, said yieldable members being arranged in opposing positions with their respective concave body portions confronting each other, and being in direct bearing contact along respective bearing portions adjacent their respective peripheral portions, adjustable deforming means to reduce the concavity of said concave body portions of said yieldable members and thereby relatably enlarge said peripheral portions thereof, said deforming means being adapted to enlarge said peripheral portion of each of said yieldable members into pressure engagement with the wall of an opening to indent the wall of the opening at the peripheral portions of said concave members, thereby forming a continuous indentation adjacent the peripheral portion of each of said yieldable members, whereby the opening is sealed and said expandable plug is constrained therein against axial displacing forces, said adjustable deforming means upon opposite movement thereof resulting in an increase in the concavity of said concave body portions of said yieldable members and thereby relatably reduce said peripheral portion of each of said yieldable members for removal from said opening.

3. In a rigid supporting structure having wall means defining an opening therein, an expandable metal plug comprising a first yieldable member, a second yieldable member, each yieldable member defining a concave body portion, a peripheral portion defining the extent of said body portion, and an aperture centrally thereof, said yieldable members being arranged in opposing positions with their respective concave body portions confronting each other and being in direct bearing contact along respective bearing portions adjacent their respective peripheral portions; threaded bolt means having a head an a threaded shank extending therefrom, said threaded shank being position in the apertures of said yieldable members and extending therethrough, said head of said bolt means being positioned in operative engagement with the portion of said first yieldable member adjacent the aperture thereof, and exteriorly thereof, and nut means threadedly engaged on said shank portion in operative engagement with the portion of said second yieldable member adjacent the aperture thereof, threaded movement of said nut means along said bolt means toward the head thereof deformably decreasing the concavity of each of said yieldable members to provide a related enlargement in the peripheries thereof, whereby, when said plug is positioned in an opening, said nut means is operable to enlarge the peripheral portion of each of said yieldable member into pressure engagement with the wall of said opening to indent said wall adjacent the peripheral portion of each of said yieldable members, thereby forming a continuous indentation in said wall adjacent each said peripheral portion whereby said opening is sealed and said plug is constrained in said opening against axial displacing forces.

4. The invention of claim 3 in which the peripheral portion of each said disc includes a continuous sharp peripheral edge having a generally V-shaped cross-section, said sharp peripheral edges of said pair of discs being adapted to concentrate the outward force of said discs as they are compressibly enlarged into indenting engagement with the wall of the opening.

5. The invention of claim 3 wherein said bolt means is arranged to extend beyond said threadedly engaged nut means, and holding means formed on the portion of said bolt extending beyond said nut means adapted for non-rotational gripping by wrench means, whereby said bolt means may be held non-rotational and said nut means rotated at the same side of said plug.

6. The invention of claim 3 including gasket means disposed on said bolt means at each disc of said pair of discs to seal said apertures, said gasket means being positioned between the head of said bolt means and the portion of the convex face of one said disc against which it is adapted to bear and between said nut means and portion of the convex face of the other said disc against which it is adapted to bear.

7. An expandable metal plug comprising a first yieldable member, a second yieldable member, each defining a dished body portion intermediate its periphery, said dished body portions confronting each other, and said yieldable members being in direct bearing contact along respective bearing portions adjacent their respective peripheries, each said yieldable member defining an aperture through its central portion; threaded bolt means disposed in said apertures and extending therethrough with the head of said bolt means operatively positioned in contact with the portion of said first yieldable member adjacent the aperture thereof, and nut means threadedly engaged on the portion of said bolt means extending through the aperture in said second yieldable member and operatively positioned in contact with the portion of said member adjacent thereto, and exteriorly thereof, whereby when said nut means is threadedly moved toward the head of said bolt, said first and second members are deformed to a lesser dished configuration, thereby providing a related enlargement of the peripheries of said yieldable members said adjustable deforming means up opposite movement thereof resulting in an increase in the concavity of said concave body portions of said yieldable members and thereby relatably reduce said peripheral portion of each of said yieldable members for removal from said opening.

References Cited
UNITED STATES PATENTS 2,720,893   10/1953   Foreman _____ 220—24.5
3,017,053   1/1962   Mitchell _____ 220—24.5
3,175,727   3/1965   Piel _____ 220—24.5

THERON E. CONDON, Primary Examiner.
JAMES B. MARBERT, Examiner.